US012021298B2

(12) United States Patent
Li

(10) Patent No.: US 12,021,298 B2
(45) Date of Patent: Jun. 25, 2024

(54) TERMINAL DEVICE

(71) Applicant: SHANGHAI MORUAN TELECOM TECHNOLOGY CO., LTD., Shanghai (CN)

(72) Inventor: Wei Li, Shanghai (CN)

(73) Assignee: SHANGHAI MORUAN TELECOM TECHNOLOGY CO., LTD., Shanghai (CN)

( * ) Notice: Subject to any disclaimer, the term of this patent is extended or adjusted under 35 U.S.C. 154(b) by 144 days.

(21) Appl. No.: 17/785,310

(22) PCT Filed: Dec. 21, 2020

(86) PCT No.: PCT/CN2020/138086
§ 371 (c)(1),
(2) Date: Jun. 14, 2022

(87) PCT Pub. No.: WO2021/121423
PCT Pub. Date: Jun. 24, 2021

(65) Prior Publication Data
US 2023/0034182 A1 Feb. 2, 2023

(30) Foreign Application Priority Data
Dec. 19, 2019 (CN) ......................... 201911315734.8

(51) Int. Cl.
*H01Q 1/24* (2006.01)
*H01Q 1/22* (2006.01)

(52) U.S. Cl.
CPC ........... *H01Q 1/243* (2013.01); *H01Q 1/2266* (2013.01)

(58) Field of Classification Search
CPC ............................ H01Q 1/243; H01Q 1/2266
See application file for complete search history.

(56) References Cited

U.S. PATENT DOCUMENTS

| | | | |
|---|---|---|---|
| 9,652,649 | B2 | 5/2017 | Lai et al. |
| 2013/0214978 | A1 | 8/2013 | Tsai et al. |

FOREIGN PATENT DOCUMENTS

| | | | |
|---|---|---|---|
| CN | 202679438 | U | 1/2013 |
| CN | 108039582 | A | 5/2018 |
| CN | 108767443 | A | 11/2018 |
| CN | 110994133 | A | 4/2020 |
| EP | 1 793 328 | A1 | 6/2007 |
| EP | 2 662 925 | B1 | 4/2018 |

OTHER PUBLICATIONS

International Search Report for PCT/CN2020/138086 mailed on Mar. 17, 2021.

*Primary Examiner* — Graham P Smith
(74) *Attorney, Agent, or Firm* — The PL Law Group, PLLC

(57) ABSTRACT

A terminal device according to an embodiment of the present application includes a circuit board and a display module stacked on the front surface of the circuit board. A side surface of the display module facing the circuit board comprises a metal area covered with metal and a first radiation area without metal covering. The first radiation area is provided with an antenna electrically connected with an RF module of the circuit board. The circuit board is provided with a mounting opening corresponding to the antenna. A structure of the terminal device on the back surface of the circuit board is provided with a metal-free second radiation area corresponding to the antenna.

9 Claims, 7 Drawing Sheets

TERMINAL DEVICE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/CN2020/138086 filed on Dec. 21, 2020, which claims priority to the benefit of Chinese Patent Application No. 201911315734.8 filed in the Chinese Intellectual Property Office on Dec. 19, 2019, the entire contents of which are incorporated herein by reference.

BACKGROUND

1. Technical Field

The present application relates to the technical field of wireless communication, and more specifically, to a terminal device.

2. Background of the invention

A device that transmits or receives data via a communication line or a data transmission line is referred to as a terminal device. At present, terminal devices are developing towards wireless devices, which rely on their internal antennas to exchange data with an external wireless communication network. With the complexity of terminal products and the development of communication technology, the number of antennas has increased sharply, while the space available for installing antennas in the terminal device has decreased. How to design an environment suitable for antenna operation has become the focus of design.

In order to ensure the omnidirectional communication effect of antennas, a clearance area is usually arranged in the terminal device. The so-called clearance area refers to a clean space left for antennas by keeping the antennas away from metal components, to prevent metal materials from affecting the radiation performance of the antennas. In some cases, a typical terminal device usually comprises a rear shell, an alloy layer, a circuit board, and a display screen that are stacked in sequence. The circuit board and various elements and components occupy a lot of space inside the terminal device. In order to ensure that antennas have good radiation performance, antennas are usually installed at the corners of and around the terminal device, so as to be kept as far away as possible from the circuit board and other metal components.

However, if antennas are distributed around the terminal device, the clearance area is small, resulting in poor radiation effect of the antennas.

SUMMARY

Embodiments of the present disclosure provide a terminal device, so as to solve the problem that in some cases various antennas are distributed around a terminal device and their clearance area is small, leading to poor radiation effect of the antennas.

Embodiments of the present disclosure provide a terminal device, comprising a circuit board and a display module stacked on the front surface of the circuit board. A side surface of the display module facing the circuit board comprises a metal area covered with metal and a first radiation area without metal covering. The first radiation area is provided with an antenna electrically connected with an RF module of the circuit board. The circuit board is provided with a mounting opening corresponding to the antenna. A structure of the terminal device on the back surface of the circuit board is provided with a metal-free second radiation area corresponding to the antenna.

In an embodiment, the circuit board comprises a first board and a second board. The first board and the second board are spaced apart by a radiation slot with a set distance. The mounting opening is arranged in the radiation slot.

In an embodiment, the first board is fixedly mounted on the terminal device, and the second board is slidably mounted on the terminal device along a first direction relative to the first board. During sliding, there are a first position where they are separated by the radiation slot, and a second position where the second board is in contact with the first board to close the radiation slot. The terminal device further comprises a driving device driving the second board to move between the first position and the second position.

In an embodiment, the driving device comprises a driving motor fixedly mounted on the terminal device, a threaded rod whose rotation axis is parallel to the first direction, and a bracket connected with the second board. The bracket threadedly fits with the threaded rod. The threaded rod rotates around the axis under the action of the driving motor.

In an embodiment, a control device for controlling the movement of the driving device according to the signal quality is further contained. When the antenna needs to work, the control device controls the driving device to move, and the second board is driven by the driving device to the first position. When the antenna does not need to work, the control device controls the driving device to move, and the second board is driven by the driving device to the second position.

In an embodiment, the terminal device comprises an alloy layer and a rear shell on the back surface of the circuit board. A projection area of the alloy layer and the rear shell corresponding to the antenna is the second radiation area free of metal.

In an embodiment, the second radiation area is not smaller than a vertical projection of the antenna on a corresponding structure.

In an embodiment, the antenna is a multiple input multiple output antenna.

In an embodiment, the display module is a liquid crystal display. The back surface of the liquid crystal display comprises the metal area covered with a steel sheet and the first radiation area without steel sheet covering.

In an embodiment, the terminal device is a mobile phone or a tablet computer.

With respect to the terminal device provided in embodiments of the present application, by providing the first radiation area without metal covering on the side surface of the display module facing the circuit board, the antenna integrated in the first radiation area can keep good communication with the external wireless network in the direction facing the display module, thereby avoiding metal interference. At the same time, a mounting opening is provided on the circuit board at a position corresponding to the antenna, and a second radiation area free of metal is provided on the structure of the terminal device on the back surface of the circuit board, so that the antenna can also communicate with the external wireless network in the direction facing the circuit board. The first radiation area, the second radiation area and the mounting opening on the circuit board jointly constitute the clearance area of the antenna, so that the antenna integrated on the back surface of the display module can always keep good communication with the external wireless network. Moreover, as compared to arrangement of antennas on the surrounding sidewalls of the terminal device which causes the antennas to communicate with the wireless network only through sidewalls, the terminal device provided in embodiments of the present application increases the clearance area of antennas and improves the communication effect of antennas by the specially arranged mounting opening, first radiation area and second radiation area. Therefore, the problems of the existing terminal device that antennas are arranged on the surrounding sidewalls, the clearance area of antennas is smaller, and the communication effect is poor are solved.

BRIEF DESCRIPTION OF THE DRAWINGS

In order to illustrate the technical solutions of the embodiments of the present application more clearly, a brief introduction is presented below to the accompanying drawings used in the description of the embodiments. Obviously, the drawings in the following description are some embodiments of the present application, and those of ordinary skill in the art may further obtain other drawings from these drawings without the exercise of any creative effort.

DETAILED DESCRIPTION

In order to make the objectives, technical solutions and advantages of the embodiments of the present application clearer, the technical solutions in the embodiments of the present application will be clearly and completely described in conjunction with the accompanying drawings. It is apparent that the embodiments to be described are only part not all of the embodiments of the present application. All other embodiments obtained by those of ordinary skill in the art without the exercise of creative effort on the basis of the embodiments in the present application pertain to the protection scope of the present application. The following embodiments and features in the embodiments may be combined with each other without conflict.

In the present application, unless expressly stated otherwise, the terms "install", "connected", "connect", "fix" and other terms are to be read as open terms, e.g., which may be a fixed connection, a detachable connection or an integral molding, may be a mechanical connection, an electrical connection or may communicate with each other; which may be a direct connection, an indirect connection through an intermediate medium, may be internal communication between two elements or an interaction relationship between two elements, unless otherwise clearly defined. Those of ordinary skill in the art may understand the specific meaning of these terms in the present application according to specific situations.

The terminal device provided in the embodiments of the present application is suitable for scenarios where high data transmission efficiency is required. It mainly redesigns the existing antenna distribution solutions, increases the clearance area of antennas, and further improves the omnidirectional radiation effect of antennas, especially is suitable to communicate with a 5G communication network with excellent transmission rate and transmission timeliness.

Figure 1:
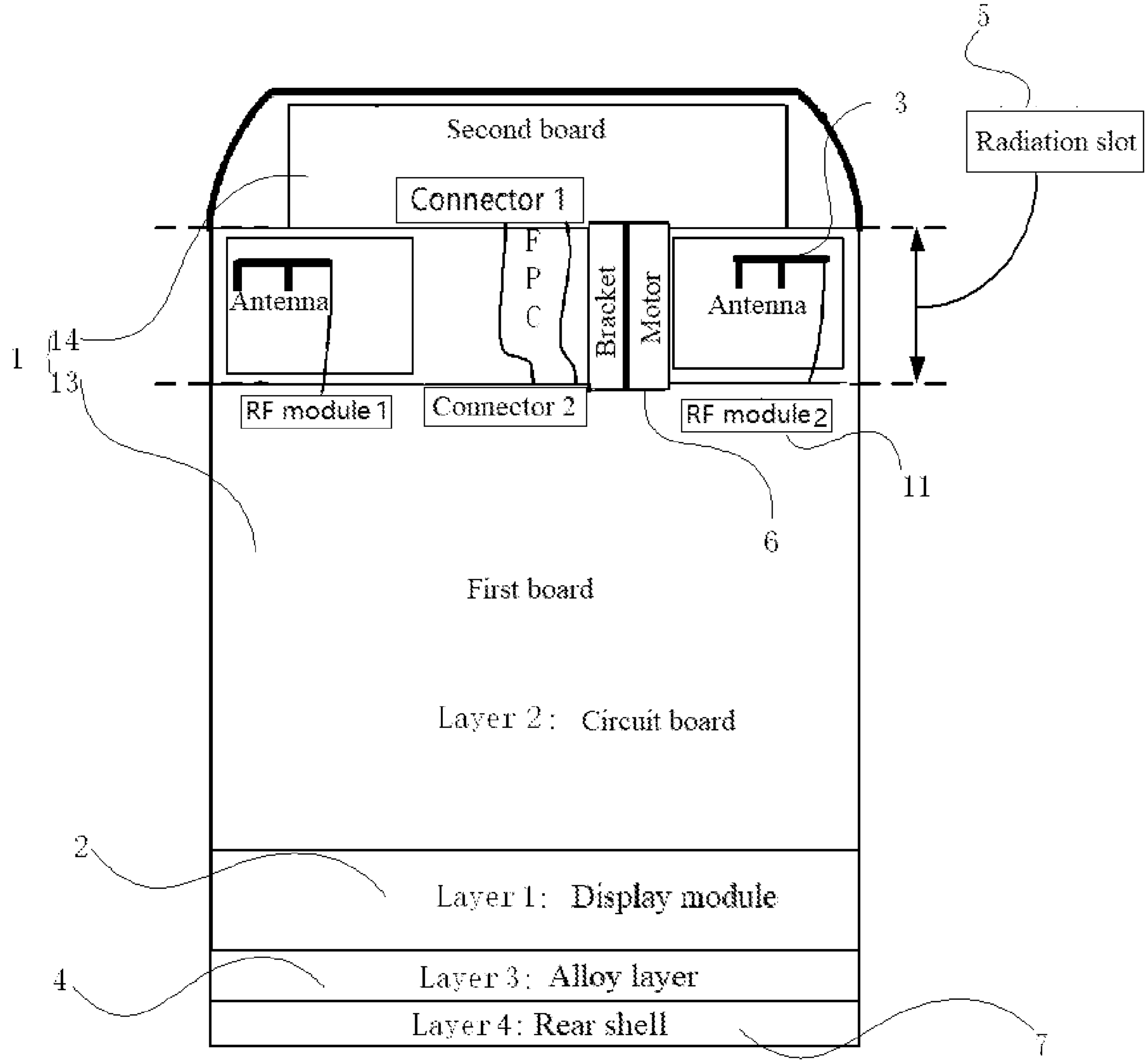
FIG. 1 shows a schematic view of overall stacking of a terminal device provided in an embodiment of the present application.
Figure 2:
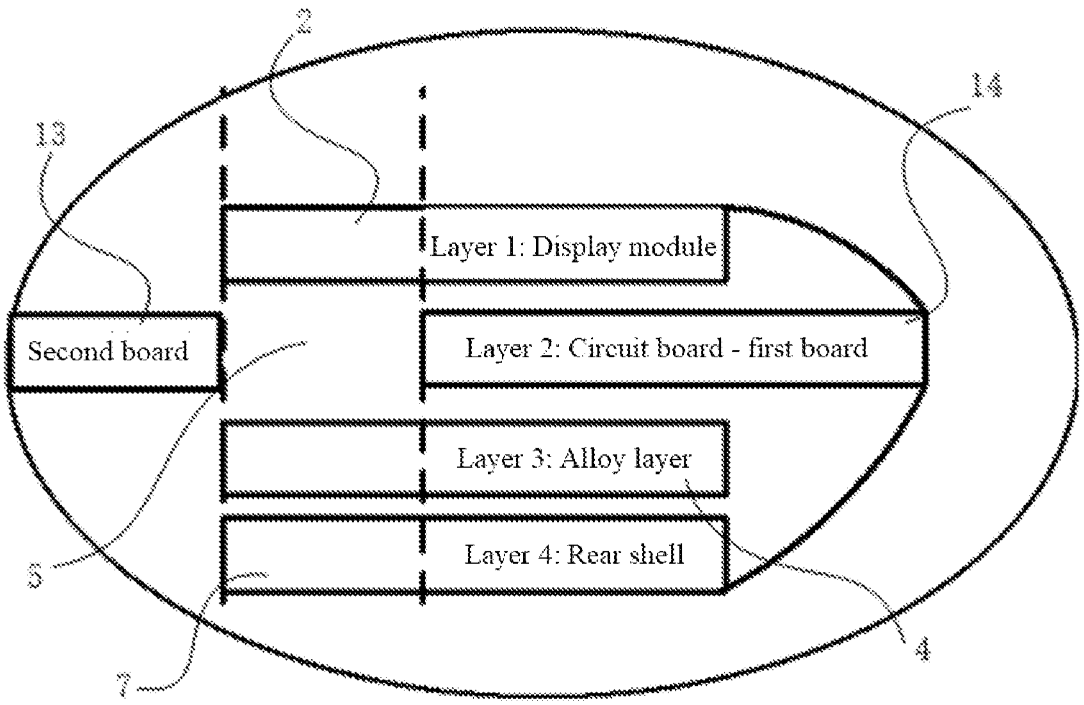
FIG. 2 shows a partial side view of a terminal device provided in an embodiment of the present application.
Figure 3:
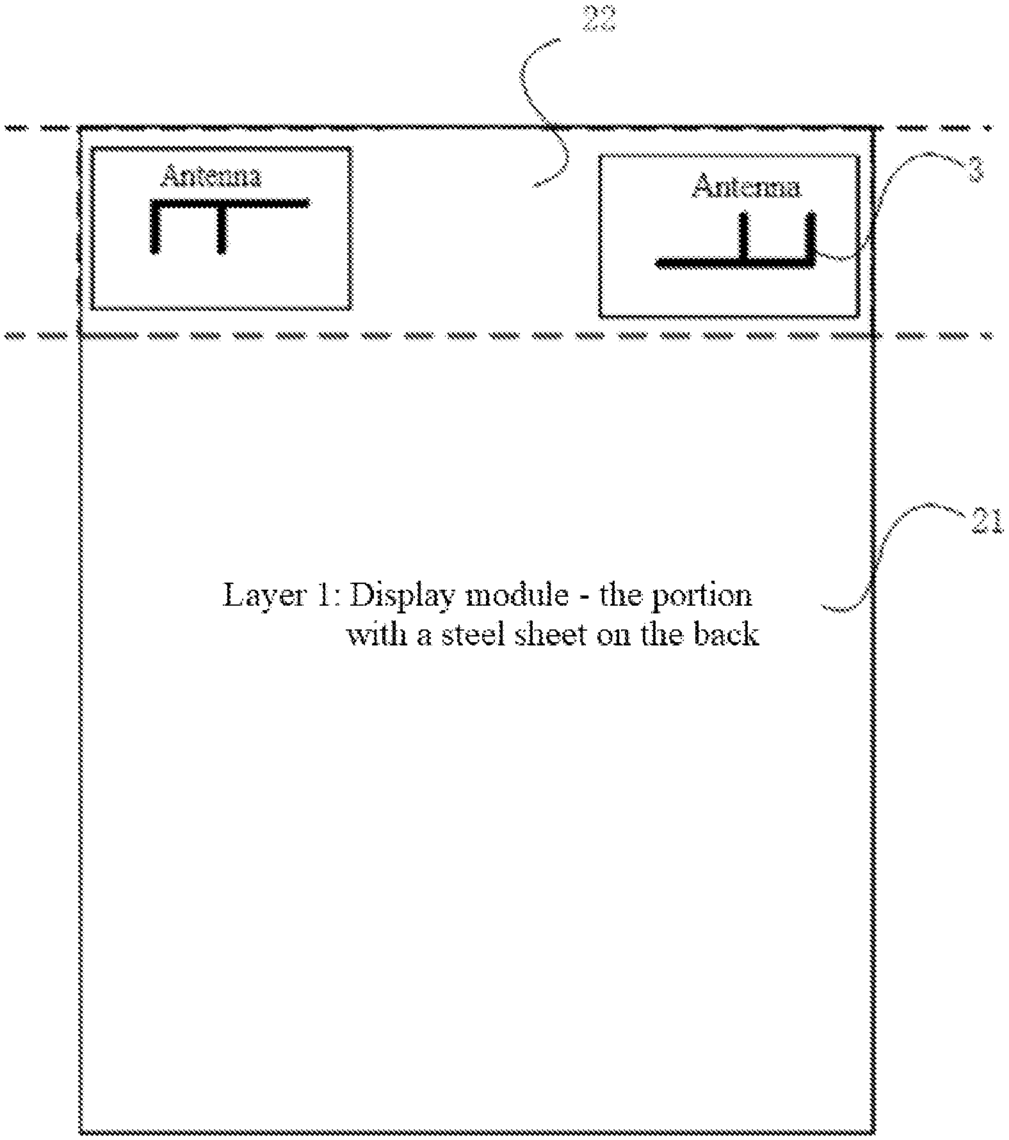
FIG. 3 shows a structural schematic view of a display module provided in an embodiment of the present application.
Figure 4:
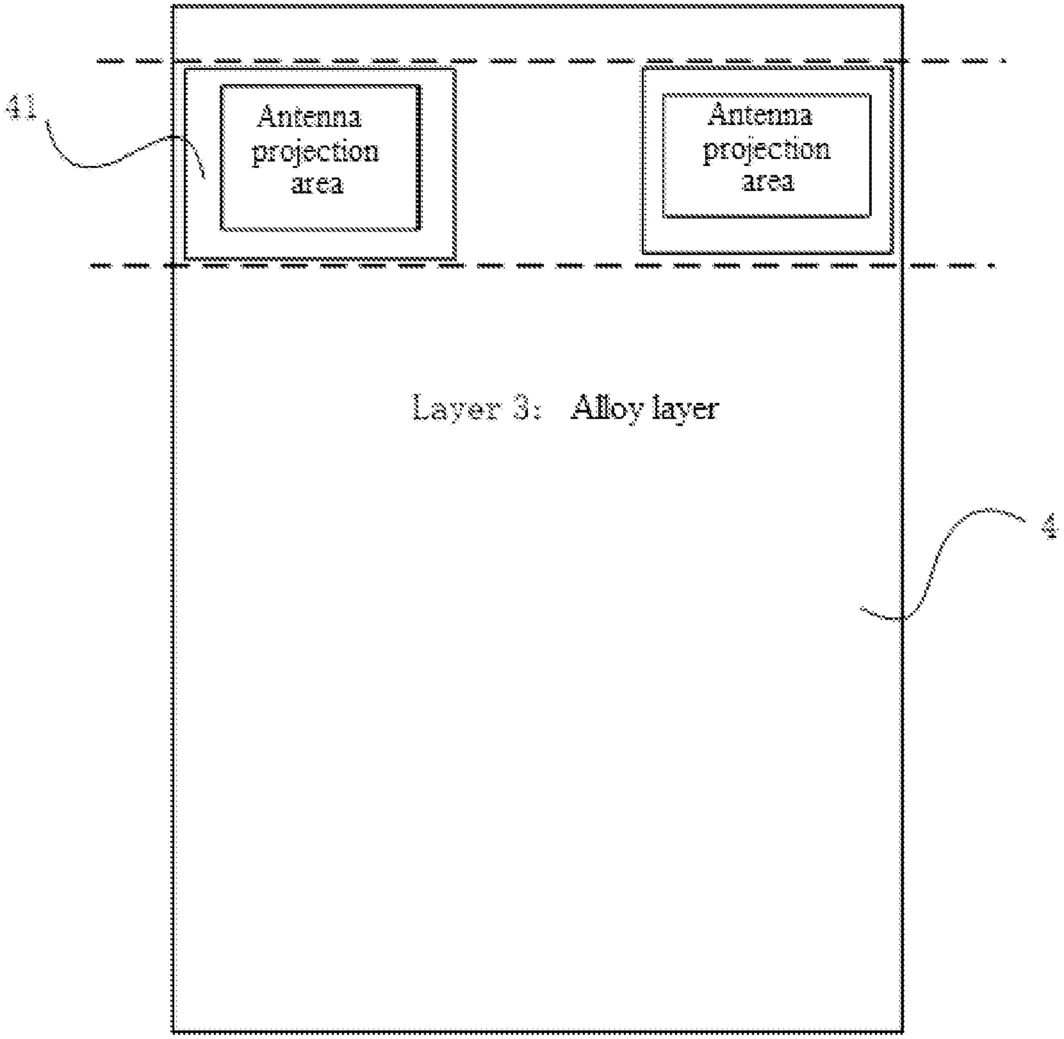
FIG. 4 shows a structural schematic view of an alloy layer provided in an embodiment of the present application.
Figure 5:
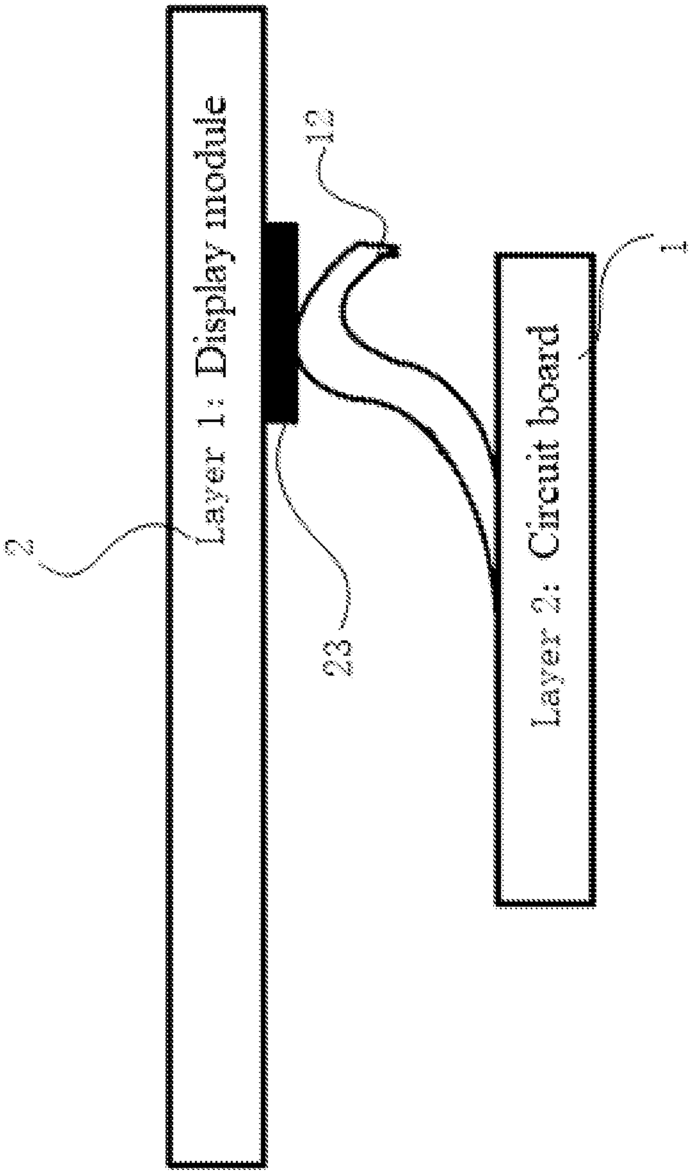
FIG. 5 shows a schematic view of electrical connection between an antenna and a motherboard provided in an embodiment of the present application.
Figure 6:
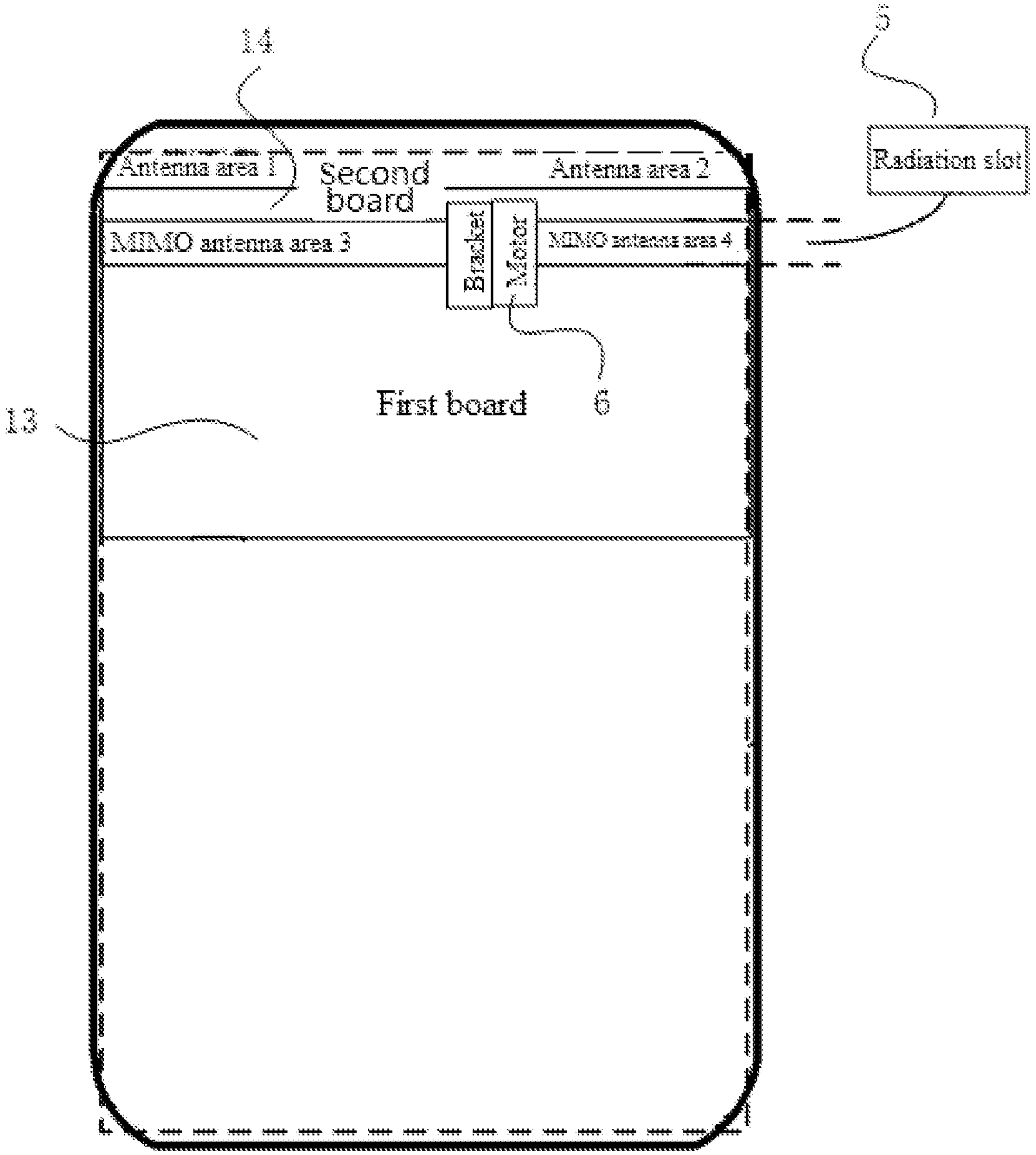
FIG. 6 shows a schematic view of a terminal device provided in an embodiment of the present application where a radiation slot is opened.
Figure 7:
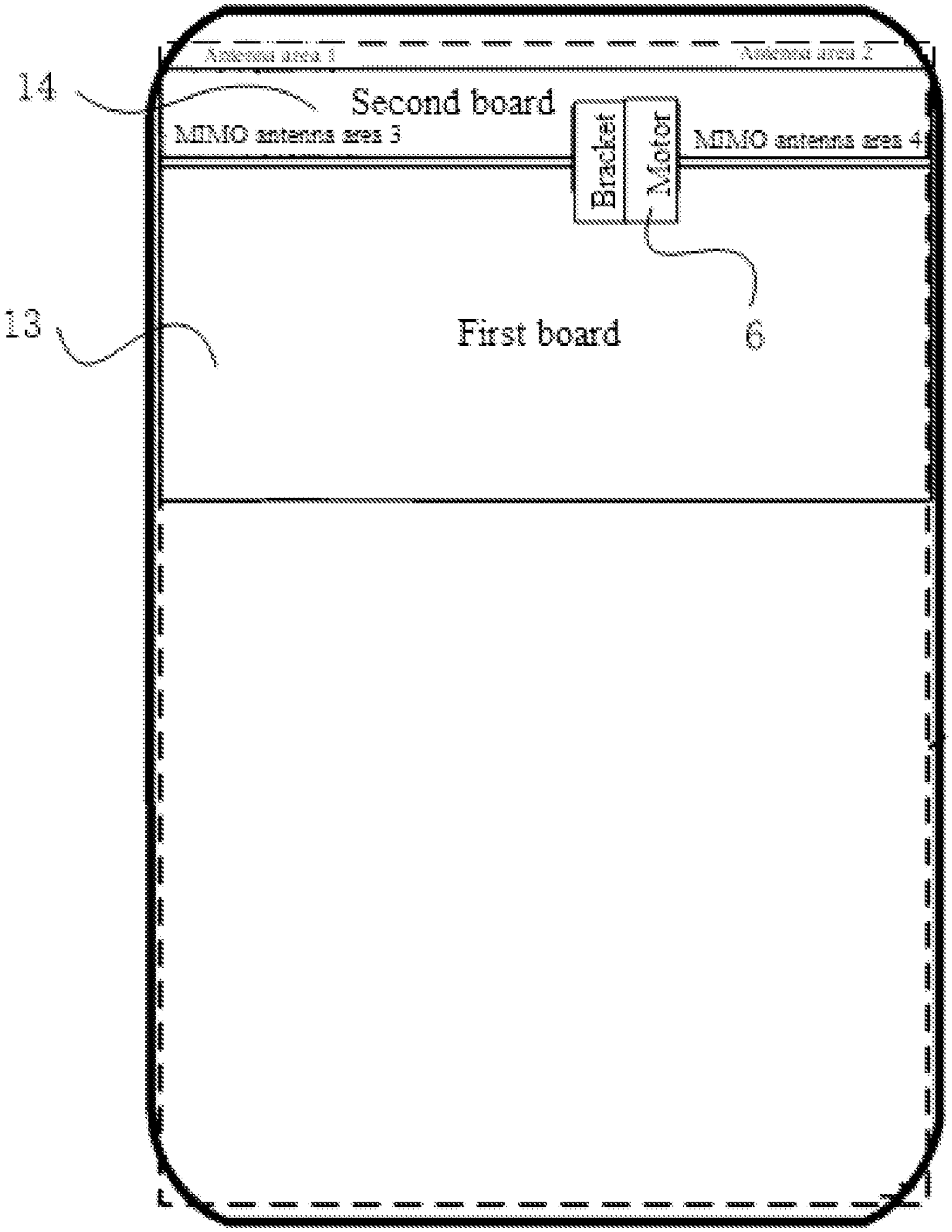
FIG. 7 shows a schematic view of a terminal device provided in an embodiment of the present application where a radiation slot is closed.

FIG. 1 is a schematic view of an overall stacking of a terminal device provided in an embodiment of the present application. FIG. 2 is a partial side view of a terminal device provided in an embodiment of the present application. FIG. 3 is a structural schematic view of a display module provided in an embodiment of the present application. FIG. 4 is a structural schematic view of an alloy layer provided in an embodiment of the present application. FIG. 5 is a schematic view of an electrical connection between an antenna and a motherboard provided in an embodiment of the present application. FIG. 6 is a schematic view of a terminal device provided in an embodiment of the present application where a radiation slot is opened. FIG. 7 is a schematic view of a terminal device provided in an embodiment of the present application where a radiation slot is closed.

Reference is made to FIGS. 1 to 7. The present embodiment provides a terminal device, comprising a circuit board 1 and a display module 2 stacked on the front surface of the circuit board 1. A side surface of the display module 2 facing the circuit board 1 comprises a metal area 21 covered with metal and a first radiation area 22 without metal covering. The first radiation area 22 is provided with an antenna 3 that is electrically connected with an RF module 11 of the circuit board 1. The circuit board 1 is provided with a mounting opening, corresponding to the antenna 3. A structure of the terminal device on the back surface of the circuit board 1 is provided with a metal-free second radiation area 41, corresponding to the antenna 3.

As shown in FIG. 2, for a common terminal device, it generally comprises a rear shell, an alloy layer, a circuit board layer and a display module layer that are stacked. Of course, the terminal device may further comprise other structures. In the present embodiment, illustration is mainly provided with respect to these four layers that are closely related to the radiation effect of the antenna 3. The circuit board layer mainly comprises various types of printed circuit boards (PCBs), which may be complete boards or broken boards, or special-shaped boards such as U-shaped circuit boards and L-shaped circuit boards. The circuit board 1 is a core control component of the terminal device and comprises a central processing unit and elements and components performing various functions, which are all integrated on the circuit board 1. A radio frequency (RF) module 11 that is electrically connected with the antenna 3 is also contained. As shown in FIG. 5, an antenna shrapnel 12 electrically connected with the RF module 11 is fixed on the circuit board 1, and an unfixed free end of the antenna shrapnel 12 is tilted towards the direction of the display module 2. An antenna feed point 23 electrically connected with the antenna 3 is fixed on a side surface of the display module 2 facing the circuit board 1. When the display module 2 is stacked on the circuit board 1, the free end of the antenna shrapnel 12 rests against the antenna feed point 23 accordingly to form an electrical connection between the antenna

3 and the RF module 11, thereby realizing the effects of receiving, sending and processing high frequency radio waves by the RF module 11.

In addition, the display module layer is a component for displaying information input by a user or information provided to a user. In specific implementation, the display module 2 in the display module layer may comprise a display panel made from a liquid crystal display (LCD), an organic light-emitting diode (OLED), or the like. The back surface of various display panels is usually covered with a metal sheet to meet the grounding requirements of the display panel and at the same time improve the heat dissipation and cooling effect of the display panel. It should be understood that the metal sheet covering the back surface of the display module 2 will limit the signal receiving of the antenna 3. At this point, by hollowing out a projection area of the antenna 3 on the metal sheet, the area which is not hollowed out forms the above metal area 21, the area which is hollowed out forms the first radiation area 22, and the signal may be transmitted through the first radiation area 22 to the antenna 3 in the first radiation area 22, thereby avoiding the impact of metal on electromagnetic signals. It is noteworthy that there also exists a display module 2 without metal covering its back surface, at which point the whole back surface of the display module 2 is the first radiation area 22, thereby eliminating the step of hollowing out the metal.

In some cases, one terminal device usually has many different types of antennas. In order to facilitate the group management of the system, various antennas are usually divided into groups with different priorities by usage and importance. When arranging antennas on the terminal device, usually an antenna with a higher priority takes the position with better communication effect so as to guarantee the overall communication effect of the terminal device. Taking a smartphone as an example, antennas with higher priorities are usually arranged on the four corners of the smartphone, and antennas with lower priorities, i.e., the antenna 3 described in the present embodiment, can only be arranged on the sidewall of the smartphone. At this point, the antenna 3 is surrounded by components such as the display module 2 and the circuit board 1, so an effective clearance area can hardly be formed, and the only part where a clearance area can be formed is the sidewall of the terminal device. However, a clearance area on the sidewall of the terminal device is rather small, and the omnidirectional communication effect of the antenna 3 is not good. The terminal device provided in the present embodiment is provided with a mounting opening at the projection position on the circuit board 1 corresponding to the antenna 3, thereby avoiding the limit of the circuit board 1 on the antenna signal. At the same time, other components of the terminal device are provided with the first radiation area 22 and the second radiation area 41 corresponding to the projection position of the antenna 3, and there is no metal covering in the direction of the antenna 3 perpendicular to the circuit board 1, which results in a larger clearance area. Furthermore, there is no need to arrange antenna positions on the edges or corners of the terminal device.

With respect to the terminal device provided in the present embodiment, by providing the first radiation area 22 without metal covering on the side surface of the display module 2 facing the circuit board 1, the antenna 3 integrated in the first radiation area 22 can keep good communication with the external wireless network in the direction facing the display module 2, thereby avoiding metal interference. At the same time, a mounting opening corresponding to the position of the antenna 3 is provided on the circuit board 1, and a metal-free second radiation area 41 is provided on the structure of the terminal device on the back surface of the circuit board 1, so that the antenna 3 can also communicate with the external wireless network in the direction facing the circuit board 1. The first radiation area 22, the second radiation area 41 and the mounting opening on the circuit board 1 jointly constitute the clearance area of the antenna 3. As compared to the cases where the antenna 3 can only communicate with the wireless network through sidewalls when being provided on the surrounding sidewalls of the terminal device, the antenna 3 of the terminal device provided in embodiments of the present application has a larger clearance area, thereby improving the radiation effect of the antenna 3.

For example, as shown in FIGS. 2, 3 and 4, the side surface of the alloy layer facing the circuit board is the projection surface, the vertical projection area of the first radiation area 22 on the projection surface is the second radiation area 41, and the vertical projection area of the antenna 3, which is integrated in the first radiation area 22, on the projection surface is an antenna projection area. The area of the antenna projection area is smaller than or equal to that of the second radiation area 41.

Further, based on the above embodiments, in the present embodiment, the circuit board 1 comprises a first board 13 and a second board 14, wherein the first board 13 and the second board 14 are separated by a radiation slot 5 with a set distance, and a mounting opening is arranged in the radiation slot 5. The radiation slot 5 separates the whole circuit board 1 into the first board 13 and the second board 14, and there is not any electronic element or metal material in the whole radiation slot 5, thereby reducing the limit of the circuit board 1 on the radiation effect of the antenna 3 and further increasing the clearance area of the antenna 3.

It is noteworthy that the circuit board 1 described in the present embodiment may be mounted in the terminal device in the form of a broken board. The circuit board 1 is divided into two portions, wherein the upper circuit board 1 has a larger volume, is integrated with more functional modules, and is used as a motherboard; and the lower circuit board 1 has a smaller volume, is integrated with less functional modules, and is used as a daughterboard. The purpose of designing the circuit board 1 as a broken board is mainly to meet space requirements of other components inside the terminal device. The gap between the motherboard and the daughterboard is provided with other components with a larger volume. Taking a mobile phone as an example, the gap in the broken board may be used to install the battery of the mobile phone. Of course, after the motherboard and the daughterboard are physically separated, they also need to be electrically connected through a flexible printed circuit board (FPC) or other structures. For the radiation slot 5 in the present embodiment, it may be arranged on the motherboard or the daughterboard, as long as the radiation slot 5 is large enough to accommodate the mounting opening of the antenna 3. Taking the arrangement of the radiation slot 5 on the motherboard as an example, the specific position of the radiation slot 5 may be changed, and the specific number of the radiation slots may be adjusted. For example, there is only one radiation slot 5, and it traverses the whole motherboard to separate the motherboard into a larger first board 13 and a smaller second board 14, or the first board 13 and the second board 14 may be equally divided, or further the first board 13 is smaller than the second board 14. In addition, there may be two radiation slots 5 that do not interfere with each other. The two radiation slots divide the whole motherboard into three portions, and each radiation slot 5 accommodates the mounting opening of the antenna 3.

Considering usage requirements of the original circuit board 1, after the first board 13 and the second board 14 are separated by the radiation slot 5, they may be electrically connected using a flexible circuit board. The two boards may further be fixed to each other by a fixing bracket to keep the constant existence of the radiation slot 5.

In addition, in the present embodiment, where there is the radiation slot 5 between the first board 13 and the second board 14, the whole terminal device also needs to be adapted according to the distance of the gap. Specifically, the first board 13 or the second board 14 moves outwards to produce the distance of the radiation slot 5, and the housing of the whole terminal device also needs to be enlarged accordingly to provide a space for the first board 13 or the second board 14 to move.

Further, there may exist cases where the antenna 3 does not need to work. In order to realize the opening or closing of the radiation slot 5 in cooperation with the working state of the antenna 3, in the present embodiment, the first board 13 is fixedly installed on the terminal device, and the second board 14 is slidably installed on the terminal device relative to the first board 13 along a first direction. During the sliding process, there are a first position where they are separated by the radiation slot 5 and a second position where the second board 14 is in contact with the first board 13 to close the radiation slot. The terminal device further comprises a driving device 6 for driving the second board 14 to move between the first position and the second position. When the second board 14 is at the second position, the first board 13 and the second board 14 are closely connected with each other, the radiation slot 5 is closed so that there is no effective radiation area on the circuit board 1, and the antenna 3 is in a non-working state. When the second board 14 is at the first position, the radiation slot 5 is opened, and the antenna 3 is in a working state. Since the first radiation area 22 and the second radiation area 41 have been provided on the display module 2 and other structures of the terminal device in advance, after the radiation slot 5 is opened, the antenna 3 can normally communicate with the external wireless communication network, and the second board 14 is driven by the driving device 6 to move between the first position and the second position, so that the radiation slot 5 may be adjusted in real time.

It is noteworthy that during the movement of the second board 14, the edge and the outer side of the terminal device will have corresponding structural expansion and adaptation. For example, the housing of the terminal device can expand to provide a space for the second board 14 to move. Alternatively, a telescopic component slidable along the first direction can be provided on the terminal device, the second board 14 is integrated inside the telescopic component, and the telescopic component is driven by the driving device 6 to move between the first position and the second position. By providing the telescopic component, the overall volume of the terminal device does not need to expand, which is especially suitable for scenarios with strict volume requirements. When the antenna 3 needs to be used, the driving device 6 controls the telescopic component to extend from the terminal device.

In addition, in the present embodiment, the first direction may be a direction perpendicular to the radiation slot 5, at which point the distance for the second board 14 to slide is the shortest. Of course, the first direction may also not be perpendicular to the radiation slot 5, as long as it can be ensured that the second board 14 can slide along the first direction to be spaced apart from the first board 13 by the radiation slot 5.

In an embodiment, as shown in FIG. 7, when the second board 14 is at the second position, the first board 13 and the second board 14 are in contact with each other, and there is a contact surface between the first board and the second board. The second board moves far away from the first board along the direction (i.e., the first direction) perpendicular to the contact surface to reach the first position, just as shown in FIG. 6, at which point there is the radiation slot 5 between the second board and the first board.

Further, as a feasible implementation, in the present embodiment, the driving device 6 comprises a driving motor fixed to the terminal device, a threaded rod whose rotation axis is parallel to the first direction, and a bracket connected with the second board. The bracket threadedly fits with the threaded rod, and the threaded rod rotates around the axis under the action of the driving motor. Specifically, the threaded rod is connected on the main shaft of the driving motor. After the driving motor is powered on, the main shaft rotates and drives the threaded rod to rotate. The bracket threadedly fitting with the threaded rod moves along the axial direction of the threaded rod, so as to cause the second board 14 to move between the first position and the second position. The driving motor and the bracket may be designed to be small enough to be used inside a terminal device with a small volume or limited available space.

It is noteworthy that in the present embodiment, the driving motor is supposed to have functions of rotating both clockwise and counterclockwise. In addition, a guiding rod parallel to the threaded rod may further be provided on the side edge of the threaded rod. The guiding rod penetrates the bracket so as to ensure that the bracket will not rotate around the threaded rod during movement.

Further, in order to realize the effective control of the opening or closing of the radiation slot 5, in the present embodiment, the terminal device further comprises a control device for controlling the movement of the driving device 6 according to the signal quality. The wireless communication network is in a state of constant change. In particular, when the terminal device is a movable device, the signal will change according to a region where the terminal device is located, while the working frequency of the antenna 3 remains constant. The control device monitors resources allocated to the antenna 3 by a base station or other module, and judges whether the antenna 3 is available according to a current signal, so as to select whether to switch the antenna 3 to a working state. By making corresponding structural adjustment through an automatic control scheme, the working state of the antenna 3 may be dynamically adjusted, and the wireless performance of the multi-antenna terminal device is enhanced.

In a specific implementation, the control device may be a modem inside the terminal device, which reads the resident network information log of a current user terminal device through the communication between the modem and a software protocol layer. The log saves working states and working frequencies of current various antennas. After obtaining the working state of the antenna 3, the modem judges whether the antenna 3 needs to work, and sends a control signal into the driving device 6 to drive the second board 14 to move. The antenna 3 described in the present embodiment is a multiple input multiple output (MIMO) antenna. A terminal device with a MIMO antenna is a typical 5G module that may work under the 5G network; and a device without MIMO antenna is a typical 4G or 3G module.

Where the 5G network coverage is incomplete and the 5G network signal is not very good, the entire wireless system will fall back to the 4G or 3G network. In this case, the MIMO antenna of the 5G module does not need to work.

It is noteworthy that considering the stability of the working state of the antenna 3, during the control device controlling the driving device 6, a minimum switch time may be set, e.g., the minimum switch time may be set to 10 seconds. When the second board 14 moves to the first position, if the switch time is less than 10 seconds and the control device determines that the antenna 3 does not need to work, then the driving device 6 is not controlled to drive the second board 14 back to the second position. Thus, it may be avoided that during network signal fluctuations, the second board 14 repetitively moves in a short time because of the impact of the control device, causing trouble to users.

Further, based on the above embodiments, in the present embodiment, the terminal device comprises a rear shell 7 and an alloy layer 4 on the back surface of the circuit board 1, and a projection area of the alloy layer 4 and the rear shell 7 corresponding to the antenna is the second radiation area 41 free of metal. Both the alloy layer 4 and the rear shell 7 are structures of the terminal device on the back surface of the circuit board 1, which are mainly used to increase the overall structural strength of the terminal device, protect internal parts, and realize the effect of enhancing heat dissipation. Of course, besides the alloy layer 4 and the rear shell 7, the terminal device described in the present embodiment may further be provided with other structures on the back surface of the circuit board 1, and the present embodiment is not intended to limit in this regard. All of these metal-containing structural components on the back surface of the circuit board 1 are provided with the second radiation area 41, so that the antenna 3 can communicate with the wireless network through the second radiation area 41.

Further, in order to guarantee the effective radiation of the antenna 3, in the present embodiment, the second radiation area 41 is not smaller than a vertical projection of the antenna 3 on a corresponding structure. Likewise, the first radiation area 22 is also supposed to be not smaller than a vertical projection of the antenna 3 on the display module 2, so that the antenna 3 is ensured with a good clearance area.

The present embodiment does not impose any requirement on the specific implementation form of the antenna 3. For example, the antenna 3 may be a planar inverted F-shaped antenna (PIFA), a monopole antenna, a dipole antenna, or the like. In addition, the specific shapes of the first radiation area 22 and the second radiation area 41 are also not limited in the present embodiment. The first radiation area 22 and the second radiation area 41 may be regular or irregular shapes such as a rectangle, a circle and an ellipse, as long as the minimum area of the first radiation area 22 and the second radiation area 41 is ensured to be larger than that of a vertical projection of the antenna 3 on a corresponding structure.

Alternatively, in the present embodiment, the antenna 3 is a multiple input multiple output antenna. The MIMO antenna uses multiple antennas at both sending and receiving ends, so that an antenna system with multiple channels is formed between the sending and receiving ends, which may greatly increase the channel capacity, is one of key technologies for realizing 5G communication, and makes the terminal device provided in the present embodiment applicable to the 5G communication network.

Overall control logics and control solutions of a terminal device described in the present embodiment are provided below.

Depending on the specific communication architecture used by the terminal device, transceiver chips in the terminal device may be divided into those with MIMO RF front-end and those without MIMO RF front-end. The transceiver chip with MIMO RF front-end adopts 1T4R (1-output-4-input) mode, including a main antenna for transmitting and receiving signals, and a diversity antenna, a main MIMO antenna and a diversity MIMO antenna only for receiving signals. This pattern is the architecture of a typical 5G device, and the MIMO antennas may be used to receive 5G signals. It may be understood that other solutions with MIMO antennas are similar, e.g., MIMO antennas in WIFI modules or MIMO antennas in other modules. The present embodiment is not detailed in this regard.

The transceiver chip without MIMO RF front-end adopts 1T2R mode, including a main antenna for transmitting and receiving signals and a diversity antenna only for receiving signals. This pattern is the architecture of a typical 3G or 4G LTE (Long Term Evolution) device.

In some scenarios, the MIMO antenna does not need to work. For example, where the performance of the MIMO antenna receiving 5G signals is rather bad, the wireless base station will not allocate resources to the MIMO antenna; or where the effect of the 5G network coverage is bad, the whole terminal device will fall back to 1T2R mode from 1T4R mode, the whole system returns to the 4G or 3G network, and the MIMO antenna in the 5G module does not need to work.

The MIMO antenna is arranged in a telescopic component movable relative to the terminal device, and a Modem arranged inside the terminal device is used as a control device. The driving device 6 comprises a driving motor and a bracket, which can drive the telescopic component to move under the control of the Modem. Whether the MIMO antenna needs to work may be controlled through the following logic:

First of all, working states of MIMO antennas are divided into MIMO antennas not working and MIMO antennas working. The specific control logics are as shown in Table 1 below:

TABLE 1

MIMO Antenna Working State Logics

| Working State of MIMO Antenna | State of Telescopic Component | Antenna Clearance | System Tracking |
|---|---|---|---|
| MIMO antenna does not work | Telescopic component is closed | MIMO antenna has no radiation slot | Modem tracks whether the MIMO antenna of the system works |
| MIMO antenna works | Telescopic component is opened | MIMO antenna has a radiation slot | Modem tracks whether the MIMO antenna of the system works |

As shown in Table 1, first, where the MIMO antenna does not work, the driving motor drives the telescopic component to be closed, the second board 14 moves to the second position, the radiation slot 5 is closed, and the Modem keeps tacking whether the MIMO antenna needs to work; second, where the MIMO antenna works, the driving motor drives the telescopic component to be opened, the second board 14 moves to the first position, the radiation slot 5 is opened, and the Modem keeps tracking whether the MIMO antenna needs to work.

In addition, when the MIMO antenna needs to work continuously, two different control logics may further be set, one of which is compatible with the above control logics, and the other is not compatible with the above control logics. The specific control logics are as shown in Table 2 below:

TABLE 2

MIMO Antenna Working State Logics

| Working State of MIMO Antenna | | State of Telescopic Component | Antenna Clearance | System Tracking |
|---|---|---|---|---|
| MIMO antenna does not work | | Telescopic component is closed | MIMO antenna has no radiation slot | Modem tracks whether the MIMO antenna of the system works |
| MIMO antenna works | | Telescopic component is opened | MIMO antenna has a radiation slot | Modem tracks whether the MIMO antenna of the system works |
| MIMO antenna works continuously | Compatible solution | Telescopic component is opened continuously | MIMO antenna has a radiation slot | Modem tracks whether the MIMO antenna of the system works (MIMO antenna works continuously) |
| | Incompatible solution | Telescopic component is no longer needed, i.e., just a stacking solution in which a radiation slot is reserved between the first board and the second board. | MIMO antenna has a fixed radiation slot | Modem does not need to track whether the MIMO antenna of the system works |

As shown in Table 2, in addition to the above two control logics, two different solutions are added in Table 2. The first solution is an upward compatible solution: in case of continuous working, the driving motor drives the telescopic component to be opened continuously, the second board 14 moves to the first position and then keeps unchanged, the radiation slot 5 is opened continuously, and the Modem tracks whether the MIMO antenna works and the continuous working state. The second solution is incompatible with the above solutions and is proposed as an exception of the present embodiment: the terminal device may further not be provided with a driving motor, telescopic component and Modem, and the first board 13 is directly connected with the second board 14 at the first position via a bracket to form a fixed radiation slot 5.

Further, on the basis of the above embodiments, in the present embodiment, the display module 2 is a liquid crystal display, the back surface of which includes a metal area covered with a steel sheet and a first radiation area 22 without a steel sheet. The liquid crystal display, i.e., LDC screen, is a common display component. In particular, smart wearable devices, mobile phones and computers are all provided with larger LCD screens. Furthermore, with the development of technology, the area of an LCD screen on a terminal device will become increasingly large, and accordingly, the clearance area provided for antennas will reduce. By hollowing out a portion from the steel sheet on the back surface of the LCD screen, the first radiation area 22 is formed, which may guarantee the clearance area for the antenna 3. The steel sheet is mainly used to cause the LCD screen to be grounded and protect it against the electromagnetic effect of internal electric elements of the terminal device. It may be understood that when arranging the first radiation area 22, besides guaranteeing the clearance area for the antenna 3, some grounding measures may further be reserved, so as to avoid the problem of electromagnetic compatibility caused by insufficient grounding of the LCD screen.

Alternatively, in the present embodiment, the terminal device may be a mobile phone or a tablet computer. It is noteworthy that in the present embodiment, the terminal device is not limited to the above mobile phone or tablet computer, but may further be implemented in other forms. For example, the terminal device described in the present embodiment may include mobile terminals such as a notebook computer, a portable media player, a navigation device, a wearable device, a smart bracelet and a pedometer, or may also include fixed terminals such as a digital TV box, a desktop computer, etc.

Finally, it is noteworthy that the foregoing embodiments are only used to illustrate the technical solutions of the present application, rather than limiting. Although the present application has been explained in detail with reference to the foregoing embodiments, those of ordinary skill in the art should understand that modifications to the technical solutions disclosed in the foregoing embodiments or equivalent substitutions of part or all of technical features are available. These modifications or substitutions do not cause the essence of a corresponding technical solution to depart from the scope of the technical solution of the present application.

What is claimed is:

1. A terminal device, comprising:

a circuit board; and a display module stacked on a front surface of the circuit board, wherein a side surface of the display module facing the circuit board comprises a metal area covered with metal and a first radiation area without metal covering;

the first radiation area is provided with an antenna electrically connected with an RF module of the circuit board, the circuit board is provided with a mounting opening corresponding to the antenna;

a structure of the terminal device on the back surface of the circuit board is provided with a metal-free second radiation area corresponding to the antenna; and wherein the circuit board comprises a first board and a second board, the first board and the second board being spaced apart by a radiation slot with a set distance; and the radiation slot is the mounting opening.

2. The terminal device according to claim 1, wherein the first board is fixedly mounted on the terminal device, and the second board is slidably mounted on the terminal device along a first direction relative to the first board;

during sliding, there are a first position where the first board and the second board are separated by the radiation slot, and a second position where the first board and the second board are in contact to close the radiation slot; and the terminal device further comprises a driving device driving the second board to move between the first position and the second position.

3. The terminal device according to claim 2, wherein the driving device comprises a driving motor fixedly mounted on the terminal device, a threaded rod whose rotation axis is parallel to the first direction, and a bracket connected with the second board; and the bracket threadedly fits with the threaded rod; and the threaded rod rotates around the axis under the action of the driving motor.

4. The terminal device according to claim 2, further comprising a control device for controlling the movement of the driving device according to the signal quality, wherein, when the antenna needs to work, the control device controls the driving device to move, and the second board is driven by the driving device to the first position; and when the antenna does not need to work, the control device controls the driving device to move, and the second board is driven by the driving device to the second position.

5. The terminal device according to claim 1, wherein the terminal device comprises an alloy layer and a rear shell on the back surface of the circuit board, and a vertical projection area of the alloy layer and the rear shell corresponding to the antenna is the second radiation area free of metal.

6. The terminal device according to claim 5, wherein the area of the second radiation area is not smaller than that of a vertical projection area of the antenna on a corresponding structure.

7. The terminal device according to claim 1, wherein the antenna is a multiple input multiple output antenna.

8. The terminal device according to claim 1, wherein the display module is a liquid crystal display, the back surface of which comprises the metal area covered with a steel sheet and the first radiation area without steel sheet covering.

9. The terminal device according to claim 1, wherein the terminal device is a mobile phone or a tablet computer.

* * * * *